United States Patent [19]
Koike

[11] 3,809,937
[45] May 7, 1974

[54] STATOR FOR SINGLE-PHASE INDUCTION MOTOR

[75] Inventor: Toshio Koike, Funabashi, Japan

[73] Assignee: Hitachi, Ltd., Tokyo, Japan

[22] Filed: Nov. 14, 1972

[21] Appl. No.: 306,385

[30] Foreign Application Priority Data
Feb. 28, 1972   Japan.............................. 47-19690

[52] U.S. Cl. ............................... 310/184, 310/205
[51] Int. Cl. .......................................... H02k 3/00
[58] Field of Search .......... 310/179, 180, 166, 184, 310/174, 198, 203, 204, 205, 206, 207

[56] References Cited
UNITED STATES PATENTS

| | | | |
|---|---|---|---|
| 2,622,217 | 12/1952 | Anderson............................ | 310/166 |
| 2,470,663 | 5/1949 | Stein..................................... | 310/180 |
| 3,470,407 | 9/1969 | Richer.................................. | 310/198 |
| 3,321,653 | 5/1967 | Sonoyama........................... | 310/180 |
| 3,599,023 | 8/1971 | Bottrell................................ | 310/207 |
| 3,353,251 | 11/1967 | Linkous................................ | 310/166 |
| 2,989,654 | 6/1961 | Neyhouse ........................... | 310/203 |
| 2,808,554 | 10/1957 | Capps.................................. | 310/198 |

Primary Examiner—R. Skudy
Attorney, Agent, or Firm—Craig and Antonelli

[57] ABSTRACT

A stator for single-phase induction motors, in which a main winding consists of the same number of coil units as that of the poles of the motor to form the poles, each of the coil units is divided into two, first and second coil groups, the first and second coil groups are connected in series and the ends of this series combination are connected across a single-phase AC voltage source, and an auxiliary winding is connected in parallel with the first group only. When arranged in this way, the magnitude and phase of a current that flows in the first coil group tend to differ from those of a current that flows in the second coil group with a resultant increase in the harmonic components included in the electromotive forces generated by the coil groups. Therefore, the magnetomotive forces of auxiliary poles which are equal in number to the main poles are made dissymmetrical so as to reduce such harmonic components.

11 Claims, 17 Drawing Figures

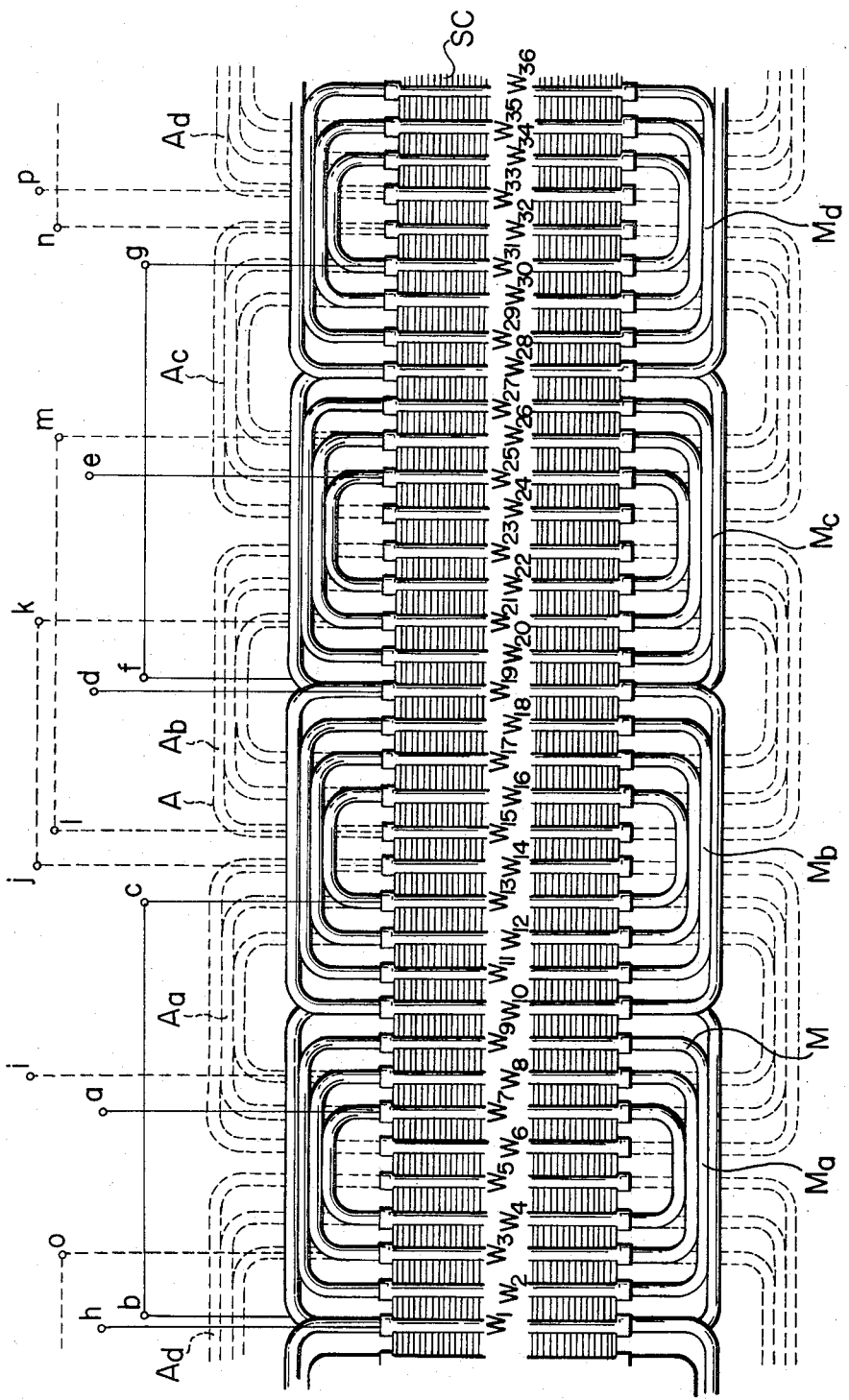

STATOR FOR SINGLE-PHASE INDUCTION MOTOR

BACKGROUND OF THE INVENTION

1. Field of the Invention

The present invention relates to a single-phase induction motor stator of the type which comprises a main winding and an auxiliary winding electrically displaced in phase from the main winding and which is particularly adapted for operation with the auxiliary winding connected in parallel with only a portion of the main winding.

2. Description of the Prior Art

Single-phase induction motors have been proposed which can be energized by either one of two voltage sources whose supply voltages are substantially in the ratio 1 : 2. In a single-phase induction motor of this type, the coil units constituting a main winding are divided into two groups so that in operation with the higher voltage the both groups are connected in series and this series combination is connected across the voltage source, whereas in operation with the lower voltage both groups are connected in parallel and this parallel combination is connected across the voltage source. On the other hand, an auxiliary winding is connected, in operation with the higher voltage, in parallel with either one of the two groups of the main winding, whereas in operation with the lower voltage the auxiliary winding is connected in parallel with both of the two groups.

Now consider the operation of a motor in which the main winding consists of only the same number of coil units as the number of poles. It will be seen that in operation with either the higher or lower voltage, the generation of inherent harmonic fields takes place. Particularly, when the motor is operated with the higher voltage, the magnetomotive forces generated by the poles tend to be dissymmetrical and this gives rise to the generation of harmonic fields. The reason is that while those coil units forming the one-half of the total poles (one of the two groups) are provided with a shunt for bypassing the current to the auxiliary winding, the other group of coil units are not provided with such a path, and thus the values of the currents in the two groups of coil units become dissymmetrical.

It has been found that in the case of a two-pole motor the effect of harmonic fields due to the dissymmetrical magnetomotive forces will be greatest when it is caused by the second harmonics, while in the case of a four-pole motor such an effect will be greatest when it is caused by the second harmonics or 3/2 th harmonics. Consequently, an asynchronous crawling torque occurs in the range corresponding to the one-half or two-thirds of the synchronous speed. Such a range corresponding to one-half or two-thirds of the synchronous speed corresponds to about the operating point of a starting device. This gives rise to an inconvenience in that the motor cannot be accelerated smoothly.

Therefore, to reduce the generation of harmonic fields to a minimum possible extent for both the higher voltage and lower voltage operations, the conventional single-phase induction motors have been constructed such that the main winding consists of two identically constructed coil groups each of which includes the same number of coil units as that of poles, and each of the coil units in one of the two coil groups is combined with one of the coil units in the other coil group to form one pole. With this arrangement, when the motor is operated with the higher voltage, though the magnitudes and phases of currents flowing in the two coil groups are not the same, the effect of harmonic fields can be minimized by virtue of the fact that each of the poles constituted by the main winding is formed by a pair of coil units, one coil unit being associated with one coil group, the other coil unit being associated with the other coil group. Such a construction has been widely used not only with the dual-voltage type single-phase induction motors, but also with other single-phase induction motors adapted to be energized by relatively high voltages.

This construction is advantageous because, as compared with the constructions in which the auxiliary winding is directly connected to a voltage source, a relatively low rated voltage capacitor can be employed for both the starding capacitor and the starting running capacitor. However, there is still a disadvantage in that since each of the main-winding poles is formed by pairs of coil groups, the number of steps for winding the coil groups tends to increase.

There is another disadvantage in that since the coils constituting two coil groups tend to be more frequently placed in the same slots, sufficiently strong layer insulation must be provided within the slots. The provision of such layer insulation necessitates a troublesome operation requiring a number of manufacturing steps.

SUMMARY OF THE INVENTION

The present invention contemplates to solve these difficulties and it is therefore a primary object of the present invention to provide a stator for single-phase induction motors, wherein a main winding consists of a plurality of coil units each of which constitutes a pole of the motor, thus the number of the coil units being equal to that of the poles of the motor, and wherein even if an auxiliary winding is connected in parallel with only one half of the coil groups or coil units of the main winding, the effect of harmonic fields can be reduced to a minimum.

According to the present invention, therefore, the absolute value of a magnetomotive force generated by at least one of auxiliary coil units each forming an auxiliary pole is made to differ from that of magnetomotive forces generated by the other coil units, so that dissymmetry among the pole magnetomotive forces generated by the main winding is cancelled by the auxiliary winding to minimize the effect of harmonic magnetomotive forces. This may be achieved by completely eliminating one of the auxiliary coil units, or otherwise by such a construction that coil units constituting the auxiliary winding and equal in number to the poles have the same number of turns and the value of the current that flows in at least one of the coil units is made to differ from those of the currents which flow in the other coil units, or alternately at least one of the auxiliary coil units has a number of turns which is different from the number of turns of the coils of the other auxiliary coil units.

BRIEF DESCRIPTION OF THE DRAWING

FIG. 2 is a more detailed view of the winding diagram shown in FIG. 1.

DESCRIPTION OF THE PREFERRED EMBODIMENTS

Figure 1:
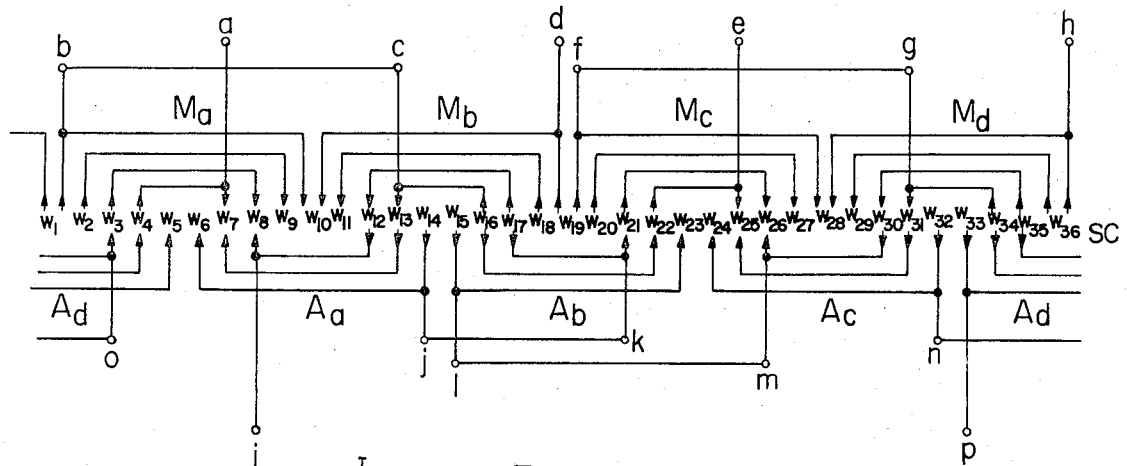
FIG. 1 is a winding diagram for a four-pole single-phase induction motor stator useful for explaining the present invention.

Referring to the accompanying drawings, FIG. 1 is useful for explaining the principles of the present invention. The principles of this invention will now be explained with reference to FIG. 1.

FIG. 2 is a more detailed view of FIG. 1 drawn to more realistically show the windings of a stator which is identical with the stator of FIG. 1.

Referring now to FIG. 1, a stator core SC is provided with slots 1 to 36. A main winding M is composed of coil units $M_a$, $M_b$, $M_c$ and $M_d$ the number of which is equal to the number of poles, thus each forming one pole. The coil units $M_a$, $M_b$, $M_c$ and $M_d$ are displaced from each other electrically by a distance $\pi$. The coil units $M_a$ consists of coils $w_{1-10}$, $w_{2-9}$, $w_{3-8}$ and $w_{4-7}$ and all of these coils are connected in series so that the currents in these coils flow in the same direction. Its terminals are a and b. The coil unit $M_b$ consists of coils $w_{10-19}$, $w_{11-8}$, $w_{12-17}$ and $w_{13-16}$ which are all connected in series for the currents therein to flow in the same direction and its terminals are represented by c and d. The coil unit $M_c$ is composed of coils $w_{19-28}$, $w_{20-27}$, $w_{21-26}$ and $w_{22-25}$ and these coils are all connected in series to cause the currents therein to flow in the same direction. Its terminals are represented by e and f. The coil unit $M_d$ is composed of coils $w_{28-1}$, $w_{29-36}$, $w_{30-35}$ and $w_{21-34}$ which are all connected in series to cause the currents therein to flow in the same direction and its terminals are represented by g and h. The terminal b is connected to the terminal c and the terminal f is connected to the terminal g.

The coil units $M_a$ and $M_b$ constitute one coil group and coil units $M_c$ and $M_d$ constitute another coil group.

An auxiliary winding A is composed of coil units $A_a$, $A_b$, $A_c$ and $A_d$ which are respectively displaced electrically by $\pi/2$ from the coil units $M_a$, $M_b$, $M_c$ and $M_d$.

The coil unit $A_a$ is composed of coils $w_{6-14}$, $w_{7-13}$ and $w_{8-12}$ and these coils are all connected in series so that the direction of the current in each of the coils is the same. And its terminals are represented by i and j. The coil unit $A_b$ is composed of coils $w_{15-23}$, $w_{16-22}$ and $w_{17-21}$ which are all connected in series to cause the currents therein to flow in the same direction and it has terminals k and l. The coil unit $A_c$ is composed of coils $w_{24-32}$, $w_{25-31}$ and $w_{26-30}$ which are connected in series to cause the currents therein to flow in the same direction and it has terminals m and n. The coil unit $A_d$ is also composed of coils $w_{33-5}$, $w_{34-4}$ and $w_{35-3}$ all connected in series to cause the currents therein to flow in the same direction and it has terminals o and p. The terminal j is connected to the terminal k, the terminal l to the terminal m and the terminal n to the terminal o.

Now assume that the stator windings constructed as described above are connected as shown in FIG. 3. In other words, the terminal d is connected to the terminal e and the terminals a and h are connected to a single-phase AC voltage source. A starting capacitor $C_s$ is provided between the terminals d and e to interconnect the terminals i and p therethrough. Namely, the auxiliary winding A is connected in parallel with one of the two groups of the coil units in the main winding. Designated as SW are contacts which open upon completion of a starting operation.

The magnetomotive force F at a given circumferential point X of the coils forming one pole can be generally given by the following equation:

$$F = \frac{PC}{\nu} \cdot I \cdot \sum_{i=1}^{\beta} n_i \left( \sin \frac{\nu W_i}{P\tau} \right) \cdot \frac{\pi}{2} \cos \left[ \frac{\nu\pi}{P\tau} x + (r-1)\tau \right] \alpha$$

where P = number of pairs of poles
r = indication of position of a coil unit, (when r = 1 r represents the reference coil unit)
n = number of turns of coil
I = current
$\nu/P$ = order of harmonics
$\tau$ = pole pitch
W = winding pitch C = constant
α = phase difference with respect to reference current
β = number of coils forming a pole (In the winding construction of FIG. 1, β = 4 for the main winding and β = 3 for the auxiliary winding.)

Figure 3:
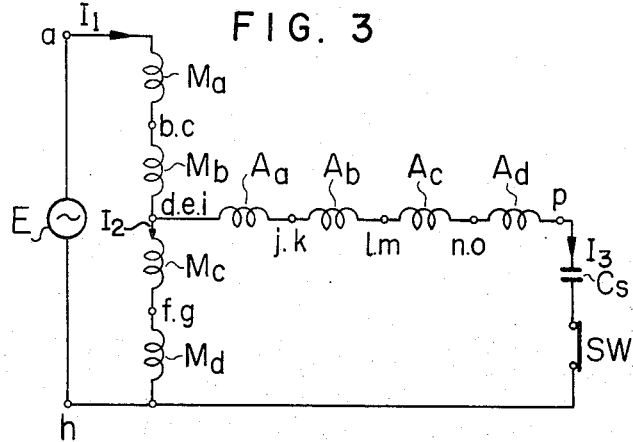
FIG. 3 is a diagram showing the connection of terminals for operating the stator of FIG. 1 with the higher voltage.
Figure 4:
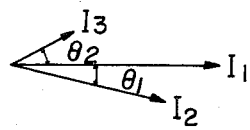
FIG. 4 is a vector diagram for the connection of FIG. 3.

In the winding connection of FIG. 3, if the magnitude of the current flowing in the coil group consisting of coil units $M_a$ and $M_b$ is represented by $I_1$, the magnitude of the current flowing in the coil group consisting of coil units $M_c$ and $M_d$ by $I_2$, the magnitude of the current flowing in the coil units $A_a$ to $A_d$ by $I_3$, the phase angle of the current $I_2$ with respect to the current $I_1$ is represented by $\theta_1$ as shown in FIG. 4 and the phase angle of the current $I_3$ with respect to the current $I_1$ by $-\theta_2$, then the magnitudes of the magnetomotive forces of the coil units $M_a$ to $M_d$ and $A_a$ to $A_d$ at the position $X = 0$ of the coil unit $M_a$ can be given as follows:

The mmf of coil unit $M_a$ is $F_{ma} = C_m \cdot N_m \cdot I_1$ (2)
The mmf of coil unit $M_b$ is $F_{mb} = -C_m \cdot N_m \cdot I_1 \cos(\nu\pi/2)$ (3)
The mmf of coil unit $M_c$ is $F_{mc} = C_m \cdot N_m \cdot I_2 \cos(\theta_1+\nu\pi)$ (4)
The mmf of coil unit $M_d$ is $F_{md} = -C_m \cdot N_m \cdot I_2 \cos(\theta_1+(3/2)\nu\pi)$ (5)

where $C_m = (2C/\nu)$ $$N_m = \sum_{i=1}^{4} n_i \sin\left(\frac{\nu W_i}{2\tau} \frac{\pi}{2}\right)$$

The mmf of coil unit $A_a$ is $F_{aa} = C_a \cdot N_a \cdot I_3 \cos(-\theta_2+¼\nu\pi)$ (6)
The mmf of coil unit $A_b$ is $F_{ab} = -C_a \cdot N_a \cdot I_3 \cos(-\theta_2+(3/4)\nu\pi)$ (7)
The mmf of coil unit $A_c$ is $F_{ac} = C_a \cdot N_a \cdot I_3 \cos(-\theta_2+(5/4)\nu\pi)$ (8)
The mmf of coil unit $A_d$ is $F_{ad} = -C_a \cdot N_a \cdot I_3 \cos(-\theta_2+(7/4)\nu\pi)$ (9)

where $C_a = (2C/\nu)$ $$N_a = \sum_{i=1}^{3} n_i \sin\left(\frac{\nu W_i}{2\tau} \frac{\pi}{2}\right)$$

On the other hand, if, in the main winding M, the coil units $M_a$ and $M_c$ are associated to form one coil group and the coil groups $M_b$ and $M_d$ form another coil group, then the equations (2) to (5) become as follows:

$F_{ma} = C_m \cdot N_m \cdot I_1$ (2)'
$F_{mb} = -C_m \cdot N_m \cdot I_2 \cos[\theta_1 + (\nu\pi/2)]$ (3)'
$F_{mc} = C_m \cdot N_m \cdot I_1 \cos\nu\pi$ (4)'
$F_{md} = -C_m \cdot N_m \cdot I_2 \cos(\theta_1 + (3/2)\nu\pi)$ (5)'

When the coil units $M_a$ and $M_d$ are formed into one coil group and the coil groups $M_c$ and $M_d$ into another, if $\nu = 3$ and $\nu = 4$ are respectively substituted into the equations (2) to (5), then $\Sigma F = F_a + F_b + F_c + F_d$ becomes $\Sigma F = 0$ when $\nu = 4$. On the other hand, when the coil units $M_a$ and $M_c$ are formed into one coil group and the coil units $M_b$ and $M_d$ into another, if $\nu = 3$ and $\nu = 4$ are respectively substituted into the equations (2)' to (5)', then $\Sigma F$ becomes $\Sigma F = 0$ when $\nu = 3$.

It will thus be seen that if the windings of FIG. 1 are connected as shown in FIG. 3, then it would suffice to substitute $\nu = 3$ into the equations and observe the effect of the 3/2th harmonics.

If $\nu = 5$ or higher, than the absolute value of mangetomotive force decreases and moreover the range of speeds affected deviate considerably in view of the operating speed of a split-phase circuit disconnecting device. Therefore, for all practical purposes, it would suffice if the effect of harmonics when $\nu = 3$ is eliminated.

The following Table 1 shows the values of F obtained by substituting $\nu = 3$ into the equations (2) to (9) and using the values for $\theta_1$, $\theta_2$, $I_1$ and $I_2$ which approximate the actual values used for a motor having a rated output of about 0.4 kw.

TABLE 1

| | Conditions | Main winding | | | | | Auxiliary winding | | | | |
|---|---|---|---|---|---|---|---|---|---|---|---|
| | | $F_{ma}$ | $F_{mb}$ | $F_{mc}$ | $F_{md}$ | $\sum_{i=a}^{d} F_{mi}$ | $F_{aa}$ | $F_{ab}$ | $F_{ac}$ | $F_{ad}$ | $\sum_{i=a}^{d} F_{ai}$ |
| Case 1 | $\nu = 3$, $I_2 = 0.82 I_1$, $I_3 = 0.3 I_1$, $\theta_1 = \pi/12$, $\theta_2 = \pi/4$, $N_m = 1.5 N_a$ | $C_m \cdot N_m \cdot I_1$ | 0 | $-C_m \cdot N_m \cdot I_1 \times 0.78$ | $C_m \cdot N_m \cdot I_1 \times 0.21$ | $A_m \cdot N_m \cdot I_1 \times 0.43$ | 0 | $-C_a \cdot N_m \cdot I_1 \times 0.45$ | 0 | $C_a \cdot N_m \cdot I_1 \times 0.45$ | 0 |
| Case 2 | $\nu = 3$, $I_2 = 0.77 I_1$, $I_3 = 0.28 I_1$, $\theta_1 = \pi/18$, $\theta_2 = \pi/6$, $N_m = 1.5 N_a$ | $C_m \cdot N_m \cdot I_1$ | 0 | $-C_m \cdot N_m \cdot I_1 \times 0.76$ | $C_m \cdot N_m \cdot I_1 \times 0.13$ | $C_m \cdot N_m \cdot I_1 \times 0.37$ | $-C_a \cdot N_m \cdot I_1 \times 0.12$ | $-C_a \cdot N_m \cdot I_1 \times 0.43$ | $C_a \cdot N_m \cdot I_1 \times 0.12$ | $C_a \cdot N_m \cdot I_1 \times 0.43$ | 0 |
| Case 3 | $\nu = 3$, $I_2 = 0.9 I_1$, $I_3 = 0.27 I_1$, $\theta_1 = \pi/12$, $\theta_2 = \pi/3$, $N_m = 1.5 N_a$ | $C_m \cdot N_m \cdot I_1$ | 0 | $-C_m \cdot N_m \cdot I_1 \times 0.86$ | $C_m \cdot N_m \cdot I_1 \times 0.23$ | $C_m \cdot N_m \cdot I_1 \times 0.37$ | $-C_a \cdot N_m \cdot I_1 \times 0.43$ | $-C_a \cdot N_m \cdot I_1 \times 0.12$ | $C_a \cdot N_m \cdot I_1 \times 0.43$ | $C_a \cdot N_m \cdot I_1 \times 0.12$ | 0 |

It will be seen from this table that the total sum $$\sum_{i=a}^{d} F_{mi}$$

of the 3/2th harmonic magnetomotive forces of the main winding M has a plus sign and therefore it is necessary to select the coils for the respective poles so that the total sum $$\sum_{i=a}^{d} F_{ai}$$

of the magnetomotive forces of the auxiliary winding A has a minus sign.

In the event of the case 1 in Table 1, it is necessary to use smaller turns for the coil unit $A_d$ than for the other coil units $A_a$ to $A_c$ and in certain cases it is necessary to entirely eliminate the coil unit $A_d$. In the event of the case 2, it is necessary that at least one of the coil units $A_c$ and $A_d$ uses smaller turns. In the event of the case 3, it is necessary that at least one of the coil units $A_a$ and $A_b$ uses smaller turns.

It will thus be seen that according to the present invention, the direction of low order harmonic fields generated by the main winding is considered and the auxiliary winding is then formed so that the direction of low order harmonic fields generated by the latter is opposite to that of the low order harmonic fields generated by the former. In this way, the low order harmonic field generated by the two windings cancel out with each other. To this end, at least one of the auxiliary poles which are provided as many as there are main poles and which are displaced in phase with respect to the main poles formed by the main winding, is formed so that the absolute value of its magnetomotive force differs from that of the magnetomotive forces by the other auxiliary poles.

Figure 5:
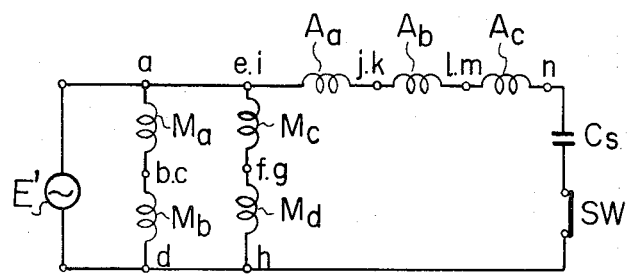
FIG. 5 is a diagram showing the connection of terminals for operating the stator of FIG. 1 with the lower voltage.

In other words, in the case of the 36-slot, four-pole, single-phase induction motor of 0.4 kw output shown in FIG. 1, with the numbers of turns shown in Table 2, the characteristic speed (V) vs. torque (T) curves shown in FIG. 5 were obtained when the coil unit $A_d$ of the auxiliary winding A was connected in series with the other coil units $A_a$ to $A_c$ (as shown in the circuit of FIG. 3) and when the coil unit $A_d$ was rendered inactive (i.e., when the coil unit $A_d$ as shown in FIG. 3 was contracted), respectively. In these tests, the capacity of the capacitor $C_s$ was 250 μF and the power supply E was 200 V.

TABLE 2

| Winding pitch | Number of turns for main winding | Number of turns for auxiliary winding |
|---|---|---|
| 10 | 22 | |
| 9 | | 36 |
| 8 | 44 | |
| 7 | | 28 |
| 6 | 28 | |
| 5 | | 22 |
| 4 | 22 | |

Figure 6:
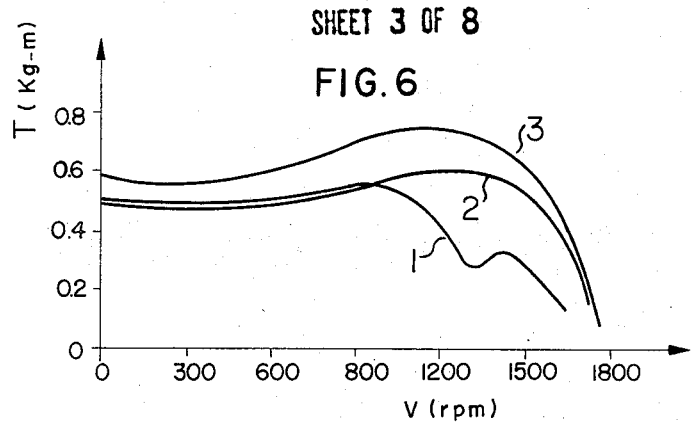
FIG. 6 is a comparative characteristic diagram showing the characteristic curves of a motor obtained when it was operated using a connection of the present invention, the connection of FIG. 3 and the connection of FIG. 5, respectively.

Referring now to FIG. 6, the curve 1 shows the characteristic when the coil unit $A_d$ was utilized, while the curve 2 shows the characteristic when the coil unit $A_d$ was disconnected. As will be seen from an examination of the curve 2, there is almost no asynchronous crawling at about 1,300 rpm and thus the curve 2 is practicable.

With the numbers of turns shown in Table 2, the magnetomotive forces of the respective coil units of the main and auxiliary windings were as shown in Table 3. In the table, the common terms were omitted.

TABLE 3

| Condition | Main winding | | | | | Auxiliary winding | | | | |
|---|---|---|---|---|---|---|---|---|---|---|
| | $F_{ma}$ | $F_{mb}$ | $F_{mc}$ | $F_{md}$ | $\sum_{i=a}^{d} F_{mi}$ | $F_{aa}$ | $F_{ab}$ | $F_{ac}$ | $F_{ad}$ | $\sum_{i=a}^{d} F_{ai}$ |
| $\nu=3$, $I_2=0.82 I_1$, $I_3=0.3 I_1$, $\theta_1=\pi/12$, $\theta_2=\pi/4$, $N_n=1006$, $N_a=78.2$ | 1.006 | 0 | −0.785 | 0.221 | 0.432 | 0 | −0.235 | 0 | 0.235 | 0 |

It will be seen from the table that if the coil unit $A_d$ is disconnected, then $$\sum_{i=a}^{d} F_{mi} + \sum_{i=a}^{d} F_{ni}$$

becomes 0.197 indicating that there is a considerable decrease in the harmonic fields.

The curve 3 in FIG. 6 shows the characteristic obtained when the two groups of coil units constituting the main winding A were connected in parallel and the coil units $A_a$ to $A_c$ were connected in parallel therewith through the capacitor $C_s$ and the starting switch SW as shown in FIG. 5. In this case, the coil unit $A_d$ was also disconnected and the power source voltage was 100 V.

With the winding connection shown in FIG. 5, it was initially thought that if the coil unit $A_d$ were eliminated despite the fact that the same current would flow in the coil units $M_a$ to $M_d$ of the main winding M, it might result in a deterioration of the characteristic. However, it was confirmed from the examination of the curve 3 that if the respective poles formed by the main winding M were symmetrical, then some dissymmetry in the auxiliary winding A would have only a limited effect. It was thus confirmed that the present invention can also be applied to dual voltage type single-phase induction motors.

While, in the embodiment described above, different turns have been used for at least one of the coil units constituting the auxiliary winding, the same end can be attained by constructing the auxiliary winding with coil units having the same winding pitch and number of turns, but making the value of the current flowing in at least one of the coil units lower than the value of the current flowing in the other coil units.

Figure 7:
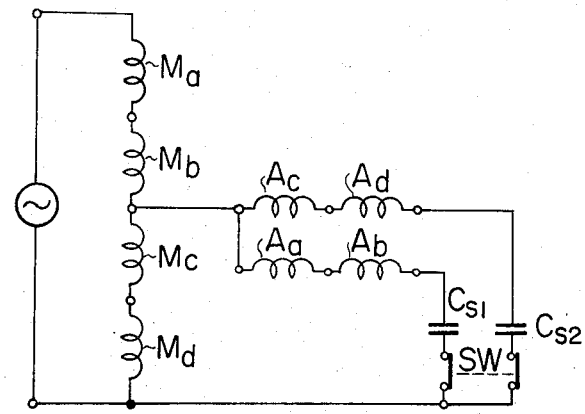
FIG. 7 is a terminal connection diagram of the windings of FIG. 1 according to an embodiment of the present invention.

FIG. 7 shows an example of such arrangement. This embodiment is similar to the case 2 shown in Table 1 and in this embodiment the value of the current flowing in the coil units $A_a$ and $A_b$ is greater than that of the current through the coil units $A_c$ and $A_d$. To attain this, a capacitor $C_{s1}$ is selected to have a higher capacity than that of a capacitor $C_{s2}$.

Figure 8:
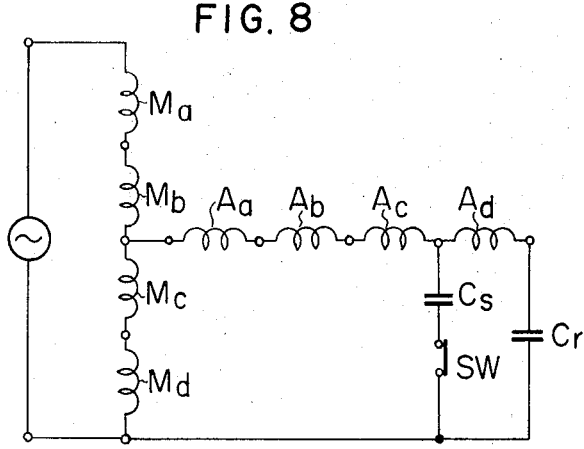
FIG. 8 is a terminal connection diagram of the windings of FIG. 1 according to another embodiment of the present invention.

The embodiment of FIG. 8 is similar to the case 1 shown in Table 1. In this embodiment, the coil units $A_a$ to $A_d$ of the auxiliary winding are formed to have the same number of turns and winding pitch, but the magnitude of the current in the coil unit $A_d$ is selected to be smaller than that of the current through the other coil units. The coil unit $A_d$ is connected in series with a capacitor $C_r$ and the starting capacitor $C_s$ is connected across this series combination. Designated as SW is a switch which is turned on upon completion of a starting operation.

This arrangement has the effect of reducing the current flowing in the coil unit $A_d$ during the starting period as compared with the current through the coil units $A_a$ to $A_c$, thereby reducing the generation of harmonic fields. After the switch SW has been opened, a current of the same magnitude as the current in the other coil units $A_a$ to $A_c$ also flows in the coil unit $A_d$ and at this time it is presumed that the harmonic of $\nu = 3$ would have the greatest effect on the speed. However, this does not give rise to any inconvenience, since the speed will have by then exceeded about two-thirds of the synchronous speed.

In this embodiment, the charge stored in the capacitor $C_s$ is prevented from being rapidly discharged by the closing of the switch SW due to the stoppage of operation of the motor, thereby preventing the contacts of the switch SW from being fused together.

Figure 9:
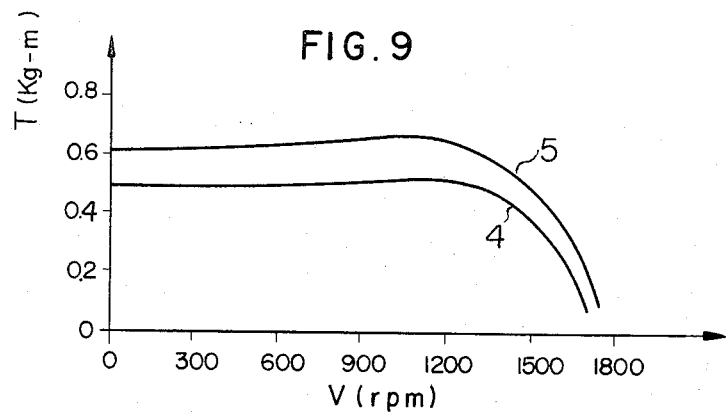
FIG. 9 is a diagram showing the characteristic curves of a motor obtained when it was operated using the connection of FIG. 8 and another connection, respectively.

The curve 4 in FIG. 9 shows the speed-torque curve of the embodiment shown in FIG. 8. The values for the capacitors $C_r$, $C_s$ and the power supply voltage were 20 $\mu$F, 250 $\mu$F and 200 V 60 $H_z$, respectively. The curve 5 shows the characteristic curve obtained when the coil units $M_a$ and $M_b$ were connected in parallel with the coil units $M_c$ and $M_d$ and then connected to the voltage source of 100 V.

In either cases, no asynchronous crawling is observed as speeds near the two-third point of the synchronous speed.

Figure 10:
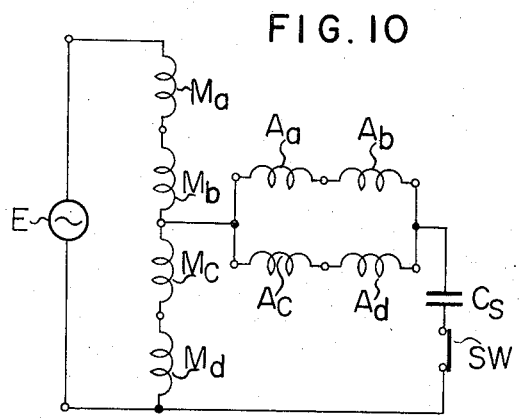
FIG. 10 is a terminal connection diagram of the windings of FIG. 1 according to a further embodiment of the present invention.

FIG. 10 shows another embodiment of the present invention which is similar to the case 2 in Table 1. In this embodiment, the coil group consisting of coil units $A_a$ and $A_b$ have more turns than the other coil group consisting of coil units $A_c$ and $A_d$. The coil units $A_a$ and $A_b$ are connected in series and this series combination is connected in parallel with the series circuit of the coil units $A_c$ and $A_d$. The intended objects of the present invention can also be attained by this arrangement.

Figure 11:
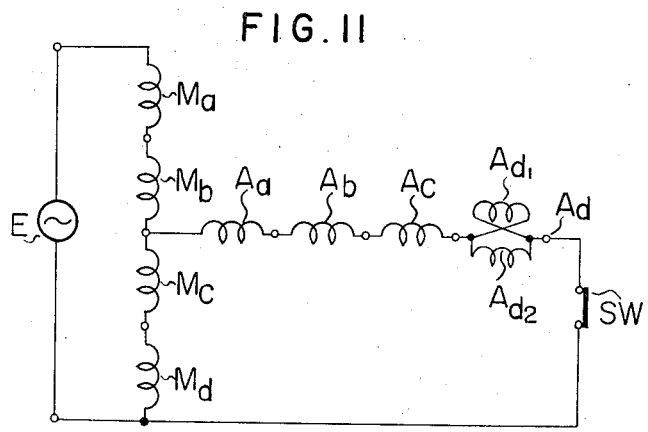
FIG. 11 is a terminal connection diagram of the windings of FIG. 1 according to a still further embodiment of the present invention.

FIG. 11 shows a still another embodiment of the present invention as applied to a so-called split-phase starting type single-phase induction motor in a limited sense, in which no phase advancing capacitor is connected to the auxiliary winding A. In this embodiment, the coil unit $A_d$ is subdivided into portions $A_{d1}$ and $A_{d2}$ and these subdivided coil portions are connected so that magnetomotive forces are generated in such directions to cancel out each other. In this manner, the reactance components can be decreased without decreasing the resistance components, thereby providing a split-phase starting type single-phase induction motor having excellent characteristics.

While the present invention has been illustrated and described as embodied in the four-pole induction motors, the present invention can also be used with other induction motors having different numbers of poles.

Figure 12:
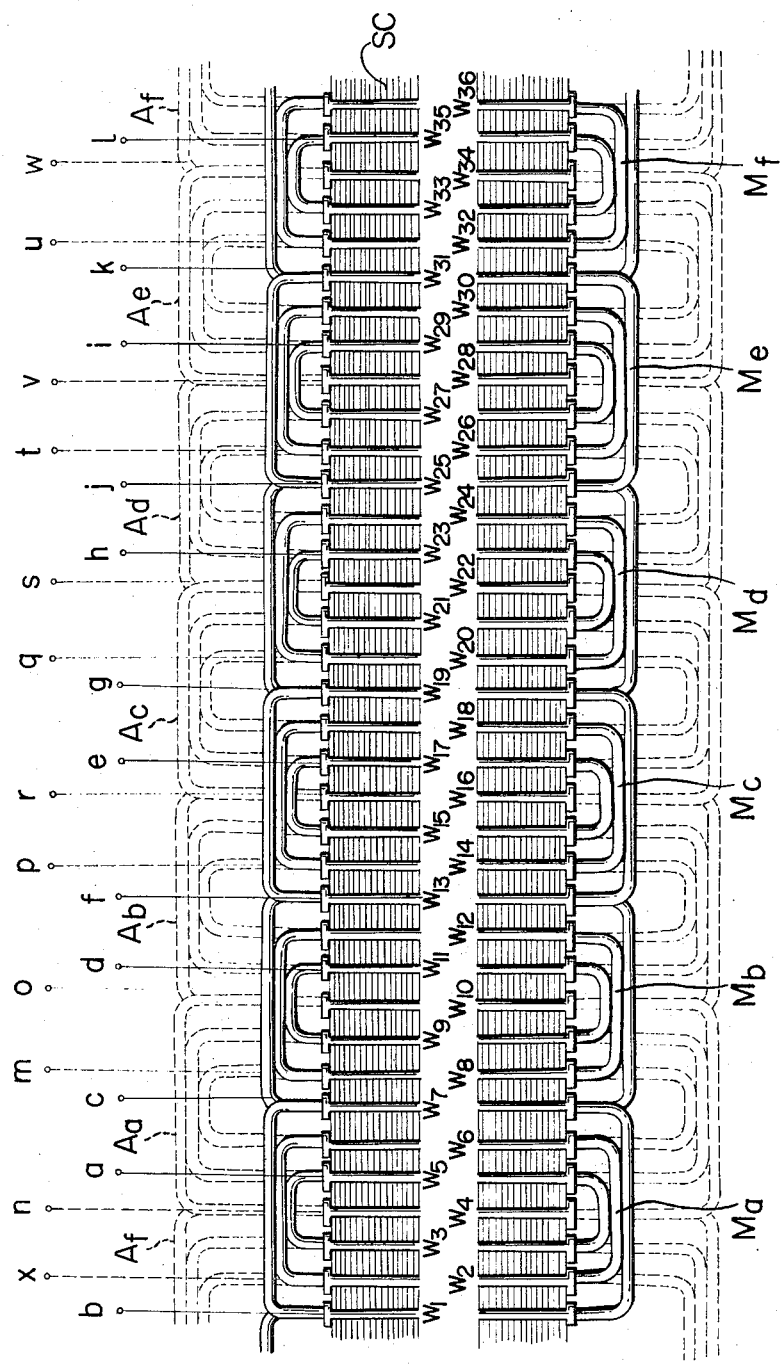
FIG. 12 is a winding diagram of a six-pole single-phase induction motor stator useful for explaining the present invention.

In FIG. 12, the present invention can also be applied to six-pole single-phase induction motors. In the arrangement of FIG. 12, the main winding M is composed of coil units $M_a$, $M_b$, $M_c$, $M_d$, $M_e$ and $M_f$ each of which forms one pole. The coil units $M_a$ to $M_f$ are electrically displaced from each other by a distance $\pi$. The auxiliary winding A is composed of coil units $A_a$ to $A_f$. The coil units $A_a$ to $A_f$ are electrically displaced by a distance $\pi/2$ with respect to the coil units $M_a$ to $M_f$, respectively.

The respective coils and terminals for each of the coil units $M_a$ to $M_f$ and $A_a$ to $A_f$ are shown in Table 4.

TABLE 4

| Coil unit | Coil | | | Terminal |
|---|---|---|---|---|
| $M_a$ | $W_{1-7}$ | $W_{2-6}$ | $W_{3-5}$ | $a, b$ |
| $M_b$ | $W_{7-13}$ | $W_{8-12}$ | $W_{9-11}$ | $c, d$ |
| $M_c$ | $W_{13-19}$ | $W_{14-18}$ | $W_{15-17}$ | $e, f$ |
| $M_d$ | $W_{19-25}$ | $W_{20-24}$ | $W_{21-23}$ | $g, h$ |
| $M_e$ | $W_{25-31}$ | $W_{26-30}$ | $W_{27-29}$ | $i, j$ |
| $M_f$ | $W_{31-1}$ | $W_{32-36}$ | $W_{33-35}$ | $k, l$ |
| $A_a$ | $W_{4-10}$ | $W_{5-9}$ | $W_{6-8}$ | $m, n$ |
| $A_b$ | $W_{10-16}$ | $W_{11-15}$ | $W_{12-14}$ | $o, p$ |
| $A_c$ | $W_{16-22}$ | $W_{17-21}$ | $W_{18-20}$ | $q, r$ |
| $A_d$ | $W_{22-28}$ | $W_{23-27}$ | $W_{24-26}$ | $s, t$ |
| $A_e$ | $W_{28-34}$ | $W_{29-33}$ | $W_{30-32}$ | $u, v$ |
| $A_f$ | $W_{34-4}$ | $W_{35-3}$ | $W_{36-2}$ | $w, x$ |

The numbers of turns for the main and auxiliary windings are shown in Table 5.

TABLE 5

| Winding pitch | Number of turns for main winding | Number of turns for auxiliary winding |
|---|---|---|
| 7 | 24 | 23 |
| 5 | 40 | 30 |
| 3 | 26 | 14 |

Figure 13:
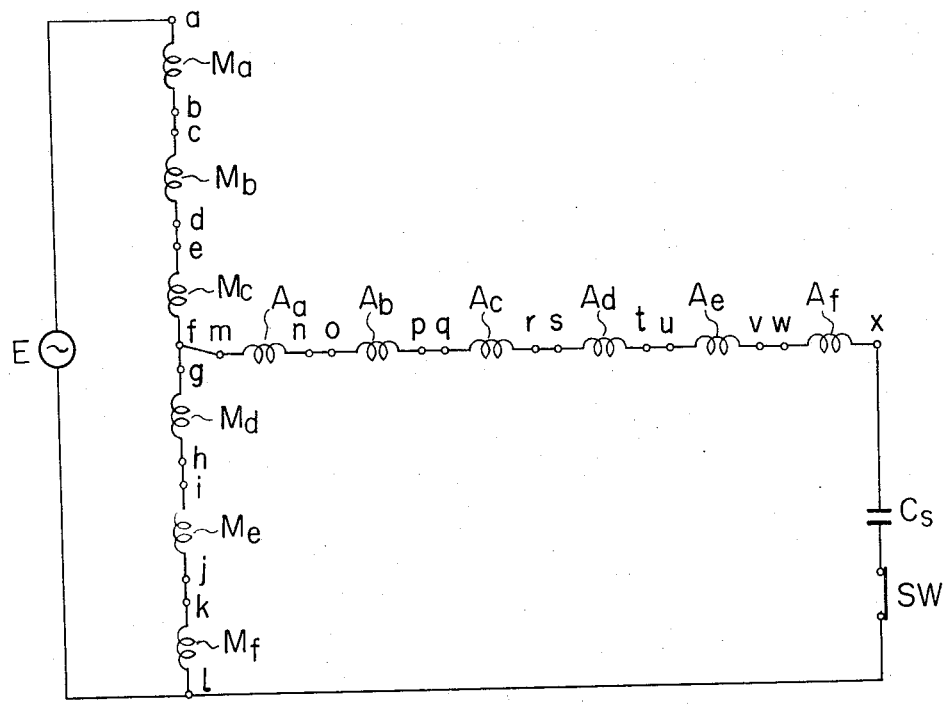
FIG. 13 is a terminal connection diagram of the windings shown in FIG. 12.

With the six-pole single-phase induction motor of 0.4 kw output constructed as above described, now let us consider the effect of harmonic fields when the stator windings are connected as shown in FIG. 13. In this case, the source voltage E is assumed to be 230 V having a frequency of 60 $H_z$ and the capacity of the capacitor $C_s$ is assumed to be 250 $\mu$F.

With the six-pole motor, the effect of harmonic fields becomes a problem when $\nu = 4$ and $\nu = 5$, respectively, in consideration of the operating point of a starting device. The following Table 6 shows the results obtained from the calculation of harmonic fields coducted by substituting $\nu = 4$ and $\nu = 5$, respectively, into the equations (2) to (9).

TABLE 6

| Value of $\nu$ | Conditions | Main winding | | | | | | | Auxiliary winding | | | | | | |
|---|---|---|---|---|---|---|---|---|---|---|---|---|---|---|---|
| | | $F_{ma}$ | $F_{mb}$ | $F_{mc}$ | $F_{md}$ | $F_{me}$ | $F_{mf}$ | $\sum_{i=a}^{d} F_{mi}$ | $F_{aa}$ | $F_{ab}$ | $F_{ac}$ | $F_{ad}$ | $F_{ae}$ | $F_{af}$ | $\sum_{i=a}^{d} F_{ai}$ |
| 4 | $I_2 = 0.83\ I_1$<br>$I_3 = 0.31\ I_1$<br>$\theta_1 = 16.5°$<br>$\theta_2 = 49.0°$<br>$N_m = 76.9$<br>$N_a = 58.4$ | 0.769 | 0.385 | −0.385 | −0.613 | −0.149 | −0.463 | 0.470 | 0.059 | −0.137 | −0.178 | −0.059 | 0.137 | 0.178 | 0 |
| 5 | $I_2 = 0.83\ I_1$<br>$I_3 = 0.31\ I_1$<br>$\theta_1 = 16.5°$<br>$\theta_2 = 49.0°$<br>$N_m = 71.3$<br>$N_a = 51.7$ | 0.713 | 0.357 | −0.357 | −0.567 | −0.138 | −0.429 | 0.437 | 0.052 | −0.121 | −0.157 | −0.052 | 0.121 | 0.157 | 0 |

Note: Precisely, the values of $\theta_1$ and $\theta_2$ when $\nu=4$ was substituted were not exactly the same with those when $\nu=5$ was substituted. However, the differences were so small that they were treated as the same.

It will be seen from Table 6 that in order to reduce the generation of harmonic fields in this embodiment, it is necessary, for both $\nu = 4$ and $\nu = 5$, to use smaller turns for all or some coils of the coil units $A_a$, $A_e$ and $A_f$ than for the other coil units $A_b$, $A_c$ and $A_d$.

Figure 14:
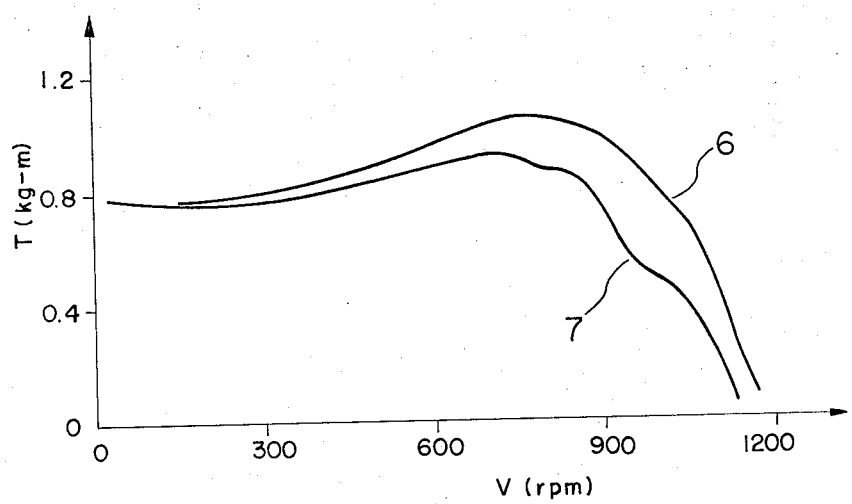
FIG. 14 is a diagram showing the characteristic curves of a motor obtained when it was operated using the connection of FIG. 13 and another connection, respectively.

The curve 6 in FIG. 14 shows the characteristic obtained when the coil unit $A_f$ was contracted. The curve 7 shows the characteristic obtained when the motor was operated with the winding arrangement shown in FIG. 12. Examination of these curves indicates that the curve 6 is much superior to the curve 7.

Figure 15:
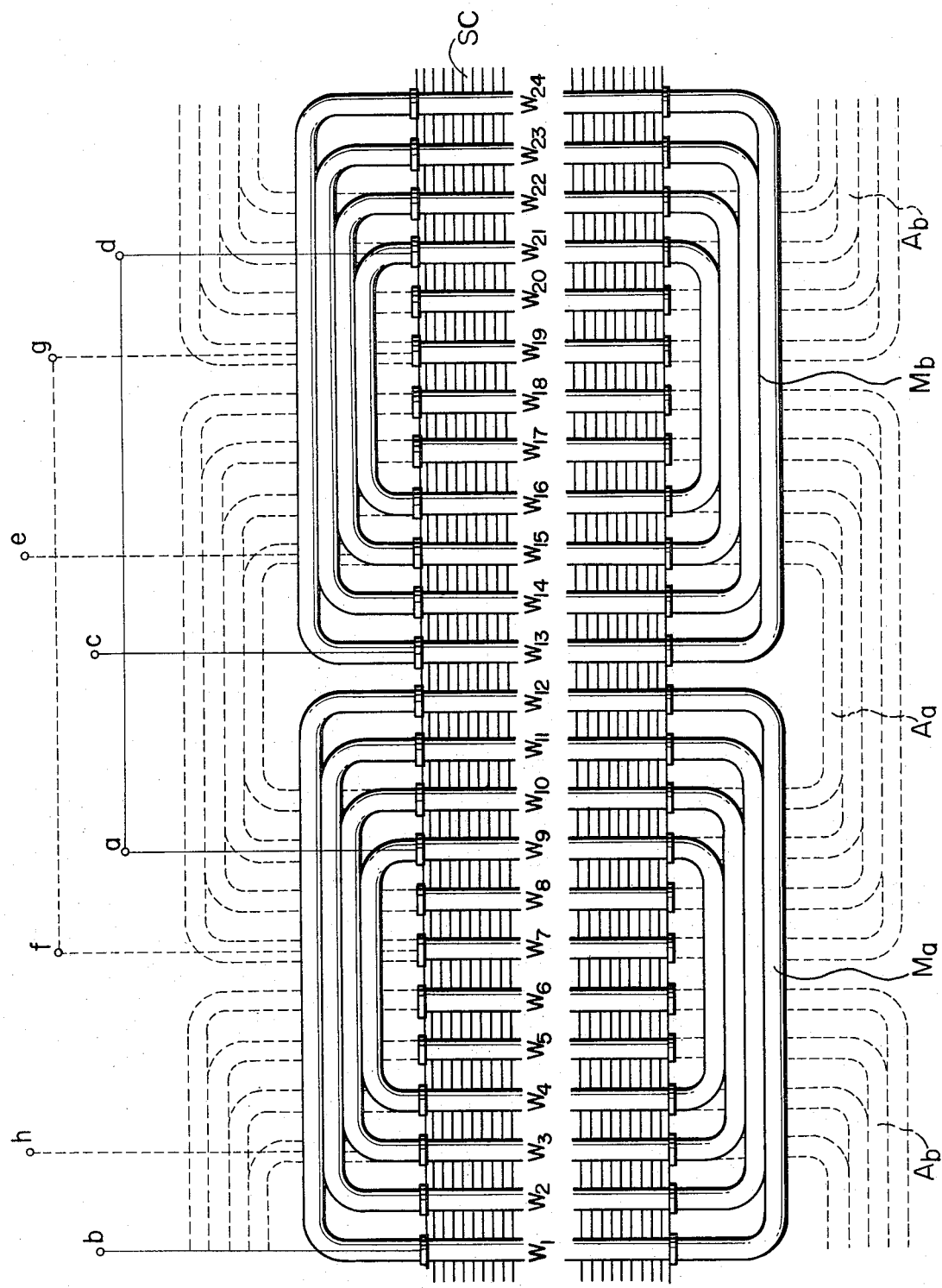
FIG. 15 is a winding diagram for a two-pole single-phase induction motor stator useful for explaining the present invention.

FIG. 15 is a winding diagram showing how the present invention can be applied to a two-pole, single-phase induction motor. In the figure, a main winding M is composed of coil units $M_a$ and $M_b$ each of which forms one pole. The coil units $M_a$ and $M_b$ are electrically displaced from each other by a distance $\pi$. An auxiliary winding A is composed of coil units $A_a$ and $A_b$. The coil units $A_a$ and $A_b$ are respectively displaced electrically by a distance $\pi/2$ with respect to the coil units $M_a$ and $M_b$.

The respective coils and terminals for each of the coil units $M_a$, $M_b$, $A_a$ and $A_b$ are shown in Table 7.

TABLE 7

| Coil unit | | | | | Coil Terminal |
|---|---|---|---|---|---|
| $M_a$ | $W_{1-12}$ | $W_{2-11}$ | $W_{3-10}$ | $W_{4-9}$ | a, b |
| $M_b$ | $W_{13-24}$ | $W_{14-23}$ | $W_{15-22}$ | $W_{16-21}$ | c, d |
| $A_a$ | $W_{7-18}$ | $W_{8-17}$ | $W_{9-16}$ | $W_{10-15}$ | e, f |
| $A_b$ | $W_{19-6}$ | $W_{20-5}$ | $W_{21-4}$ | $W_{22-3}$ | g, h |

The numbers of turns used for the main and auxiliary windings are shown in Table 8.

TABLE 8

| Winding pitch | Number of turns for main winding | Number of turns for auxiliary winding |
|---|---|---|
| 12 | 45 | 30 |
| 10 | 45 | 30 |
| 8 | 39 | 28 |
| 6 | 39 | 28 |

A two-pole 0.4-kw single-phase induction motor with the stator windings described above was connected as shown in FIG. 16. The source voltage E was assumed to be 230 volts having a frequency of 60 $H_z$ and the capacity of the capacitor $C_s$ was assumed to be 250 $\mu F$. The effect of harmonic fields in this arrangement was considered. In the case of a two-pole motor, the harmonic components of $\nu = 2$, i.e. the second harmonics exert a large effect on the acceleration torque when $\theta_1 \neq 0$. The following Table 9 shows the results obtained from the calculation of harmonic fields made by substituting $\nu = 2$ into the equations.

TABLE 9

| Condition | Main winding | | | Auxiliary winding | | |
|---|---|---|---|---|---|---|
| | $F_{ma}$ | $F_{mb}$ | $\sum_{i=a}^{b} m_i$ | $F_{aa}$ | $F_{ab}$ | $\sum_{i=a}^{b} F_{ai}$ |
| $\nu = 2$<br>$I_2 = 0.83\ I_1$<br>$I_3 = 0.41\ I_1$<br>$\theta_1 = 23°$<br>$\theta_2 = 54°$<br>$N_m = 118.8$<br>$N_a = 83.2$ | 0.1188 | −0.0908 | 0.0280 | −0.0200 | 0.0200 | 0 |

Figure 16:
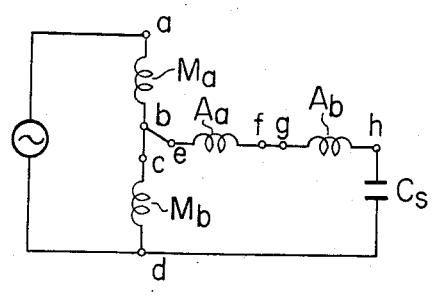
FIG. 16 is a terminal connection diagram of the windings shown in FIG. 15.

It will be seen from Table 9 that in the embodiment of FIG. 16, the generation of harmonic fields can be reduced by using a smaller number of turns for the coil unit $A_b$.

Figure 17:
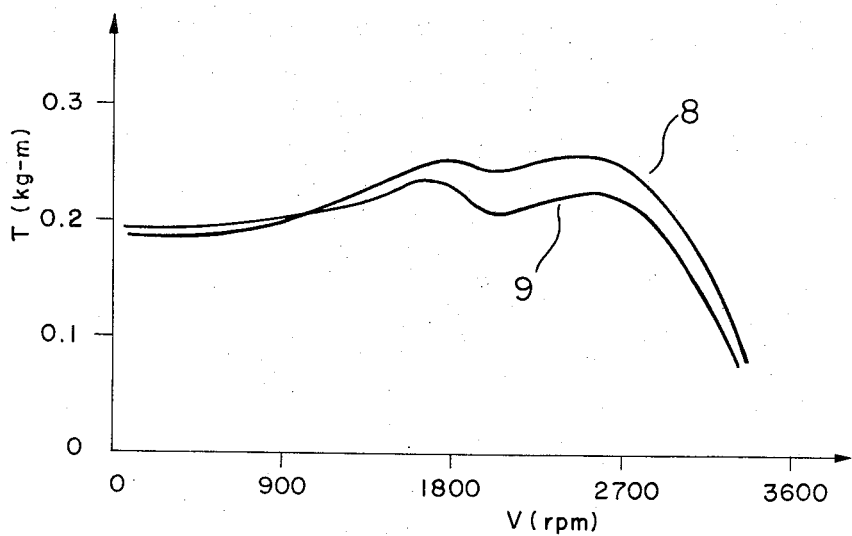
FIG. 17 is a diagram showing the characteristic curves of a motor obtained when it was operated using the connection of FIG. 16 and another connection, respectively.

In FIG. 17, the curve 8 shows the characteristic obtained when the coils of the coil unit $A_b$ at a winding pitch of 6 were removed. The curve 9 shows the characteristic obtained when the coils of the coil unit $A_b$ at a winding pitch of 6 were not removed. Examination of the curves indicates that the curve 8 is much superior to the curve 9.

While the present invention has been described with reference to the specified embodiments thereof, it should be understood that numerous other modifications and embodiments can be made without departing from the spirit and scope of the principles of the present invention.

I claim:

1. A stator for a single-phase induction motor comprising a stator core having slots formed therein; a main winding composed of a plurality of coil units, each consisting of a plurality of coils placed in said slots and forming one of main poles of the motor so that the number of said coil units is equal to that of said main poles, said coil units being divided into first and second groups including the same number of said coil units, said first and second groups of said coil units being connected in series and further connected to a source of voltage; and an auxiliary winding composed of coil units placed in said slots and connected in parallel with one group of said first and second groups of said coil units in said main winding, said auxiliary winding forming the same number of auxiliary poles as that of said main poles formed by said main winding, said auxiliary poles being displaced in phase with respect to said main poles, at least one of said auxiliary poles producing a magnetomotive force whose absolute value is different from the absolute value of magnetomotive forces produced by the remainder of said auxiliary poles, and said auxiliary winding producing a low order harmonic field directed to cancel low order harmonic fields produced by said main winding.

2. A single-phase induction motor stator according to claim 1, wherein the number of said main poles is four, said coil units of said main winding which are electrically displaced from each other with a 180-degree phase difference therebetween are formed into one coil group and the remainder of said coil units placed between said coil units forming said one group are formed into another coil group, and said low order harmonic fields are 3/2th harmonic fields.

3. A single-phase induction motor stator according to claim 1, wherein the number of said main poles is four, said coil units of said main winding which are electrically displaced from each other with a 360-degree phase difference are formed into one coil group and the remainder of said coil units are formed into another coil group, and said low order harmonic fields are 2nd harmonic fields.

4. A single-phase induction motor stator according to claim 1, wherein the number of said main poles is six, and said low order harmonic fields are 4/3th harmonic fields and 5/3th harmonic fields.

5. A single-phase induction motor stator according to claim 1, wherein the number of said main poles is two, and said low order harmonic fields are second harmonic fields.

6. A single phase induction motor stator according to claim 1, wherein said auxiliary winding is composed of a plurality of coil units each forming one of said auxiliary poles, and at least one of said coil units of said auxiliary winding is eliminated.

7. A single-phase induction motor stator according to claim 1, wherein at least one of said coil units of said auxiliary winding has a smaller number of turns than the other of said coil units of said auxiliary winding.

8. A single-phase induction motor stator according to claim 1, wherein at least one of said coil units of said auxiliary winding is divided into halves, and said halves are connected so that magnetomotive forces produced by said halves are directed to cancel each other.

9. A single-phase induction motor stator according to claim 1, wherein said coil units of said auxiliary windings are formed into two separate coil groups, and said two separate groups are connected in parallel with one of said two groups of said main winding through respective capacitors of different capacities.

10. A single-phase induction motor stator according to claim 1, wherein a part of said coil units of said auxiliary winding is connected in parallel with one of said two groups of said main winding through a starting capacitor and a switch adapted to be turned off upon completion of a starting operation, and the remainder of said coil units of said auxiliary winding is connected through a starting and running capacitor in parallel with a series circuit including said starting capacitor and said switch.

11. A stator for a single-phase induction motor comprising:
a stator core provided with slots therein;
a main winding including two groups of coil units placed in said slots, each of said coil units constituting one of main poles of the motor so that the number of said coil units is equal to the number of said main poles; and
an auxiliary winding connected in parallel with one group of said two groups of coil units and arranged in a phase-shifted relation with said main winding, said auxiliary winding including a plurality of coil units at least one of which, upon energization of the motor, produces an electromotive force different from those of the other coil units of said auxiliary winding.

* * * * *